(12) United States Patent
Graw

(10) Patent No.: US 10,341,202 B2
(45) Date of Patent: Jul. 2, 2019

(54) SMARTPHONE-ASSISTED MAINTENANCE OF A SELF-SERVICE TERMINAL

(71) Applicant: WINCOR NIXDORF INTERNATIONAL GMBH, Paderborn (DE)

(72) Inventor: Bernd Graw, Paderborn (DE)

(73) Assignee: Wincor Nixdorf International GmbH, Paderborn (DE)

(\*) Notice: Subject to any disclaimer, the term of this patent is extended or adjusted under 35 U.S.C. 154(b) by 886 days.

(21) Appl. No.: 14/478,377

(22) Filed: Sep. 5, 2014

(65) Prior Publication Data

US 2015/0074179 A1 Mar. 12, 2015

(30) Foreign Application Priority Data

Sep. 11, 2013 (EP) .................................... 13184000

(51) Int. Cl.
*G06T 7/00* (2017.01)
*H04B 5/00* (2006.01)
(Continued)

(52) U.S. Cl.
CPC .......... *H04L 43/04* (2013.01); *G06F 11/2294* (2013.01); *G06Q 30/06* (2013.01);
(Continued)

(58) Field of Classification Search
CPC ....... H04L 43/04; G07F 19/201; G06Q 30/06; G06F 11/2294; H04W 24/04; G06T 7/00; H04B 5/0031; H04N 5/23229
See application file for complete search history.

(56) References Cited

U.S. PATENT DOCUMENTS 8,214,290 B1 \* 7/2012 Vannatter ............... G06Q 10/00
370/254
8,469,260 B2 6/2013 Lyons et al.
(Continued)

FOREIGN PATENT DOCUMENTS

EP 1798620 6/2007
EP 1798620 A1 \* 6/2007 ......... G05B 23/0291

OTHER PUBLICATIONS

European Search Report dated Jan. 20, 2014.

*Primary Examiner* — Nicholas R Taylor
*Assistant Examiner* — Tania M Pena-Santana
(74) *Attorney, Agent, or Firm* — Black, McCuskey, Souers, & Arbaugh LPA

(57) ABSTRACT

A method (5) and a system 100 are provided for maintaining a self-service terminal (1). The maintenance is effected using a mobile terminal (3), such as a smartphone. A server application that can communicate first via a communication link (23) with a terminal application that is executed on the mobile terminal (3) and second via a network connection (21) with the self-service terminal (1) is executed on a server (2). Direct communication between the mobile terminal (3) and the self-service terminal (1) is not necessary. The mobile terminal (3) uses a still picture production apparatus (31) to capture both an identifier (11) for the self-service terminal (1) and an identifier (121) for a maintained component (12) of the self-service terminal (1), and transmits corresponding data to the server (2). On the basis of this, the server application can ascertain update data and communicate them to the self-service terminal (1).

18 Claims, 2 Drawing Sheets

(51) Int. Cl.
*G06F 11/22* (2006.01)
*G06Q 30/06* (2012.01)
*G07F 19/00* (2006.01)
*H04L 12/26* (2006.01)
*H04N 5/232* (2006.01)
*H04W 24/04* (2009.01)

(52) U.S. Cl.
CPC .............. *G06T 7/00* (2013.01); *G07F 19/201* (2013.01); *H04B 5/0031* (2013.01); *H04N 5/23229* (2013.01); *H04W 24/04* (2013.01)

(56) References Cited

U.S. PATENT DOCUMENTS

| | | | |
|---|---|---|---|
| 2007/0100583 A1* | 5/2007 | Yano | G05B 23/0264 |
| | | | 702/184 |
| 2008/0040273 A1* | 2/2008 | Savage | G06Q 20/1085 |
| | | | 705/43 |
| 2011/0172973 A1* | 7/2011 | Richards | G05B 23/0248 |
| | | | 703/2 |
| 2012/0118947 A1* | 5/2012 | Lyons | G07F 17/3241 |
| | | | 235/375 |
| 2012/0141136 A1* | 6/2012 | Blume | G07F 19/20 |
| | | | 398/140 |
| 2012/0173311 A1* | 7/2012 | Chang | G06Q 20/1085 |
| | | | 705/14.1 |
| 2016/0321374 A1* | 11/2016 | Addy | G06K 7/10722 |

\* cited by examiner

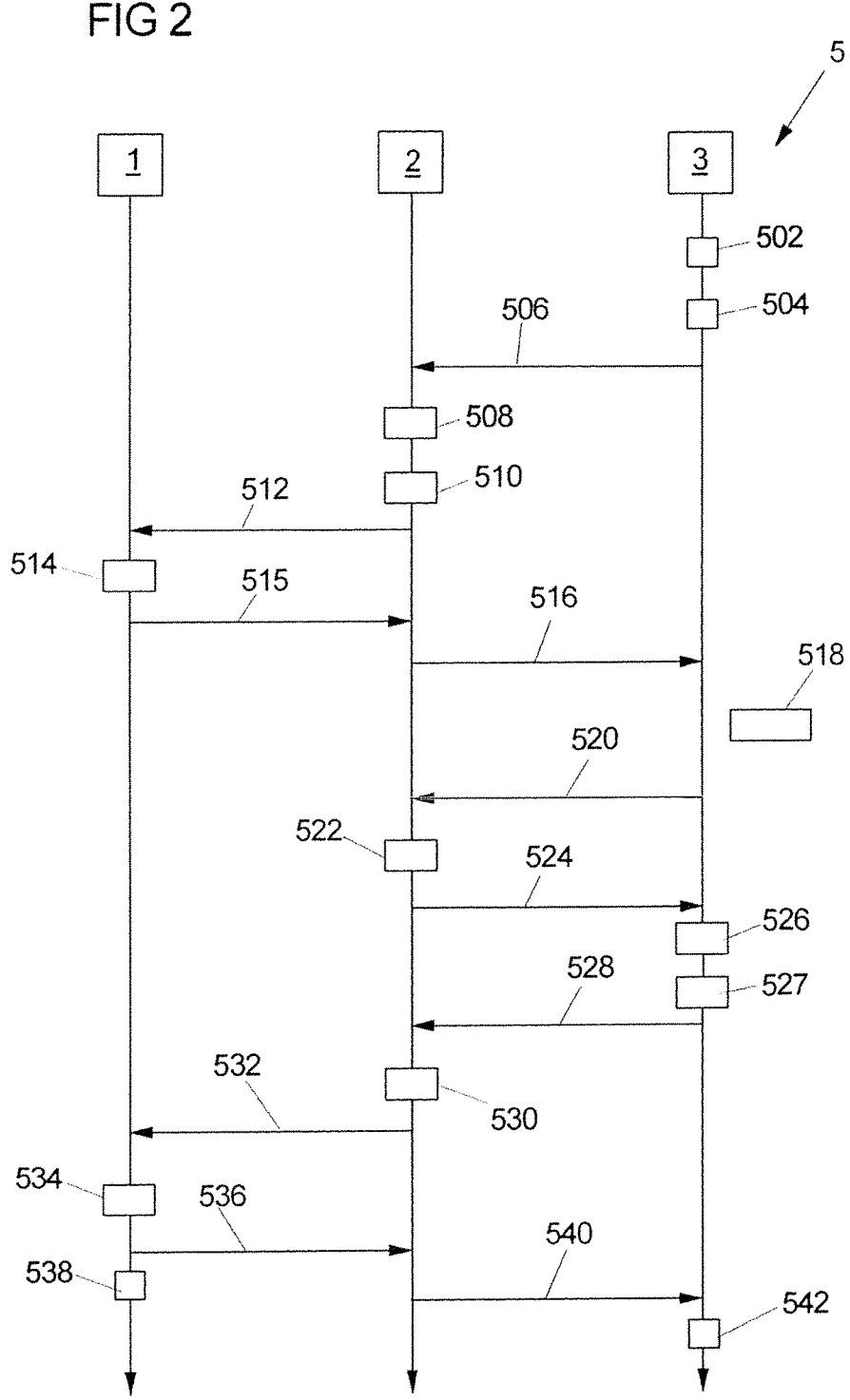

SMARTPHONE-ASSISTED MAINTENANCE OF A SELF-SERVICE TERMINAL

BACKGROUND

1. Field of the Invention

The invention relates to a method for maintaining a self-service terminal and to a system for maintaining a self-service terminal.

2. Description of the Related Art

A method for maintaining a self-service terminal is known from DE 10 2009 040928 A1, for example. The self-service terminal to be maintained therein is not connected directly to an external network or to further appliances. In order to allow maintenance and diagnosis data to be transmitted directly between the self-service terminal and a data center even without a direct connection from the self-service terminal, maintenance-sensitive data are transmitted in a nearby area of the self-service terminal, particularly using a mobile camera, in a zero-current and radio-free data transmission form. This involves the fitting of barcodes, which are read in by the mobile camera, on the components of the self-service terminal that are to be maintained. Alternatively, the camera used may be a monitoring camera that is already used anyway. DE 10 2009 040928 A1 teaches the practice of using an optical and/or acoustic data transmission link to couple a self-service terminal to a data center instead of coupling the self-service terminal to the data center directly, for example using a cable.

It is an object of the present invention to propose technical teaching according to which the maintenance of a self-service terminal by a service engineer is facilitated.

SUMMARY OF THE INVENTION

The inventive method and the inventive system allow a simpler and more fault-tolerant maintenance sequence for a self-service terminal. The entire maintenance sequence can be coordinated from the server without the need for components of the self-service terminal or the mobile terminal to be equipped with particular intelligence. According to the invention, at least three applications interlock, namely the server application for managing the self-service terminal to be maintained, the terminal application on the mobile terminal of a service engineer and the maintenance application that is executed on the self-service terminal to be maintained. Since the server can identify both the self-service terminal and the maintained component of the self-service terminal explicitly from the identifier data and still picture data that are transmitted from the mobile terminal to the server, complete coordination of the maintenance process by the server application is possible. In this case, the server is used as a central information source, the maintenance application for controlling the (maintained) components of the self-service terminal and the terminal application for instructing the service engineer and for producing still pictures and capturing the identifier of the self-service terminal to be maintained. In particular, the present invention allows self-service terminals from different manufacturers to be maintained easily and reliably, with all maintenance processes being able to be coordinated centrally from the server.

By way of example, the maintenance of a self-service terminal comprises the replacement of a cash box in an automated teller machine. In this case, the invention allows what is known as cash cycle management in a multivendor environment without the use of intelligent cash boxes. It is thus possible for a multiplicity of automated teller machines from different manufacturers ("multivendor") to be managed centrally from the server without the need for the cash boxes to be equipped with logical memories and/or logic units. It is merely necessary for the cash boxes to be identifiable. From the identification, the server ascertains relevant data for the cash box and sends said data to the automated teller machine in the form of the update data. This means that the inventive is more reliable, since, by way of example, a service engineer is prevented from manually inputting incorrect update data.

The inventive method and the inventive system for maintaining a self-service terminal (also called 'SS terminal' below for short) will be explained below.

In the present case, the term maintenance is intended to be understood to mean all measures that are used for the continuous operation of the self-service terminal. By way of example, the maintenance of an SS terminal can include the replacement and/or repair of a component or a module of the SS terminal.

By way of example, the self-service terminal may be an automated teller machine, a checkout terminal, a ticket machine, a vending machine or the like. In particular, the maintenance of a self-service terminal can be effected by replacing a cash box in an automated teller machine.

For the purpose of managing a number of self-service terminals, the server application is executed on the server of a network. The server of the network acts as a data and control center. The server is preferably connected to the internet or forms part of the Internet. The server application, that is to say a particular piece of management and/or control software, for example, is executed on the server. The server application can be used to contact a particular self-service terminal that is coupled to the server via the network, such as the Internet, and to set up operative coupling thereto. It is possible for the server and the self-service terminal to be situated a long way from one another, such as a few kilometers.

For the purpose of maintaining the self-service terminal, that is to say for the purpose of replacing a cash box in an automated teller machine, for example, a service engineer first of all proceeds to a nearby area of the self-service terminal and positions a carried mobile terminal in this nearby area. In the present case, a nearby area is intended to be understood to mean an area that is no further than a few meters away from the self-service terminal. A terminal application for maintaining the self-service terminal is then executed on the mobile terminal. By way of example, the mobile terminal may be a portable computer, a smartphone, a PDA (Personal Digital Assistant), a cell phone, a tablet or the like. By way of example, the terminal application is present in the form of what is known as an app that can be executed on the mobile terminal. The terminal application may therefore be a smartphone app, for example.

In order to maintain the self-service terminal, the self-service terminal must first of all be identified. To this end, an identifier for the self-service terminal is captured and the identifier is taken as a basis for producing identifier data. Preferably, this is done by the mobile terminal. By way of example, the identifier of the self-service terminal comprises a signaling tag, such as a Near Field Communication (NFC) tag, a Radio Frequency Identification (RFID) tag, a barcode and/or a Quick Response (QR) code. By way of example, the mobile terminal is designed to read and interpret this identifier and to transmit corresponding identifier data to the server. It is also possible for the mobile terminal to produce a still picture of a particular portion of the self-service terminal and to transmit this still picture, without analyzing it, to the server, so that the server can take the still picture itself as a basis for identifying the self-service terminal. Alternatively, it is also possible for the service engineer to input on the self-service terminal a particular command that prompts the self-service terminal to transmit identifier data to the server, which the server can use to identify the self-service terminal.

A communication link is set up between the server and the mobile terminal, so that the server application and the terminal application can communicate with one another and can interchange data, such as control messages, with one another. By way of example, the communication link can be made via a cellular mobile radio network, such as a Wireless Local Area Network (WLAN) network, Global System for Mobile communications (GSM) network, General Packet Radio Service (GPRS) network, Second/Third Generation Partnership Project (2GPP/3GPP) network and/or a Long Term Evolution (LTE) network.

After the identifier data have been transmitted to the server application and the server application has identified the self-service terminal to be maintained from the identifier data, the server application initiates execution of a maintenance application on the self-service terminal. The server thus preferably stores a database in which the identifier data have associated network addresses of self-service terminals. Thus, the server or the server application can, after receiving the identifier data, "address" the SS terminal to be maintained via the network and set up a network connection thereto that the SS terminal and the server or the respective applications can use to communicate with one another.

The maintenance application may be a control program that coordinates the sequence of the maintenance and initiates maintained components of the self-service terminal, registers them and the like. Furthermore, the maintenance application may include the representation of instructions on a screen of the self-service terminal. As a result of the initiation of the maintenance application, the self-service terminal changes from a normal mode of operation to a maintenance mode. This maintenance mode allows individual components of the self-service terminal to be maintained, that is to say repaired and/or replaced, for example. At any rate, a network connection is set up between the self-service terminal and the server and can be used by the server application to communicate with the maintenance application.

When the maintenance application has been initiated on the self-service terminal, the terminal application is executed on the mobile terminal and the communication link and the network connection have been set up, it is possible for a service engineer, instructed by particular instructions that are displayed to him on the mobile terminal by the terminal application, to perform maintenance work on the self-service terminal, such as replacing a cash box in an automated teller machine.

Following the conclusion of the maintenance work on the self-service terminal, this being communicated to the server application by virtue of the transmission of an appropriate message via the terminal application, for example, the server application determines schedule information data on the basis of the identifier data and transmits the determined schedule information data to the terminal application via the communication link. Preferably, the server thus stores a second database that assigns schedule information data to the identifier data and to which the server application has access.

The schedule information data are indicative of a component of the self-service terminal that needs to be captured at least to some extent by a still picture production apparatus of the mobile terminal. The schedule information data thus indicate what component or what portion of a component of the self-service terminal needs to be optically captured by the mobile terminal. To this end, the mobile terminal comprises the still picture production apparatus, such as a standard camera unit, which is usually incorporated into a mobile terminal, such as a smartphone, or tablet, or PDA, or a scanner, in order to capture a still picture of the component or the portion of the component of the self-service terminal. In particular, the schedule information data may also be indicative of a second identifier that is fitted to the component, such as a second QR code. This will be described in more detail further below.

On receipt of the schedule information data, the mobile terminal uses a display means, such as a standard display, to display schedule information on the basis of the schedule information data. By way of example, the terminal application uses the schedule information data to visually display on the display means of the mobile terminal what portion of the self-service terminal needs to be captured by means of the still picture production apparatus. Since the server has identified the self-service terminal, the server is also designed to acquire data that are indicative of the shape and dimensions of the self-service terminal, for example, and in this way to generate schedule information data, for example, which can be used to display the shape of the SS terminal at least to some extent on the display means of the mobile terminal, for example using a line drawing, which reveals what portion of the self-service terminal, that is to say what component or what portion of a component, needs to be captured by the still picture production apparatus of the mobile terminal. By way of example, the terminal application uses the schedule information to ask the service engineer to produce a still picture of a portion of the self-service terminal that contains all the components that are depicted for the schedule information. The terminal application then prompts transmission of the still picture or of still pictures that are indicative of the still picture to the server application by the mobile terminal.

The server application evaluates the still picture data and takes the evaluation of the still picture data as a basis for producing update data and ascertains these update data to the maintenance application that is executed on the self-service terminal. By way of example, the server application uses the still picture data to identify the maintained components, that is to say, by way of example, replaced components and also further properties relating to these components, for example a counter reading, data that are indicative of the content of an installed cash box, or the like, and transmits these update data to the maintenance application. On receiving these update data, the maintenance application can set counter information in accordance with the update data, for example, and communicate this operation to the server or to the server application. The server application can optionally then transmit to the terminal application a message that is indicative of the successful conclusion of the maintenance operation.

Further embodiments of the inventive method for maintaining a self-service terminal are described below. The additional features of these further embodiments can be combined with one another to form further exemplary embodiments, provided that they have not been expressly described as alternative to one another. In addition, it is also possible for optional features of the inventive method that have already been described above to be combined with the features described below to form some other embodiments.

According to a first embodiment, the server application executed on the server controls both the maintenance application on the self-service terminal and the terminal application on the mobile terminal. This embodiment has the advantage that the entire maintenance process can be controlled and coordinated centrally by the server. The server application thus preferably registers application states both for the maintenance application and for the terminal application. This has the further advantage that direct communication does not need to take place between the self-service terminal and the mobile terminal. This has a positive effect on the components of the self-service terminal, since these do not need to be equipped with intelligence that is necessary for such communication. Both the self-service terminal and the component of the self-service terminal that is to be maintained merely need to be provided with means that allow explicit identification both of the self-service terminal and of the component to be maintained. However, it is not necessary for the components of the SS terminal to communicate with the mobile terminal. In this respect, the mobile terminal also does not need to be designed to transmit control information to the self-service terminal or to the component of the self-service terminal that is to be maintained. The terminal may thus be a commercially available smartphone or the like. Coordination of the maintenance process accordingly requires just two connections that exist anyway or are easy to set up, namely the network connection between the server and the self-service terminal, on the one hand, and the communication link between the server and the mobile terminal, on the other hand. Maintenance of the SS terminal does not require the mobile terminal to communicate with the SS terminal.

As already explained above, the capture of the identifier and the transmission of the identifier data are preferably effected by the mobile terminal itself. By way of example, this can occur by virtue of the mobile terminal capturing the identifier of the self-service terminal, which preferably comprises a signaling tag, such as a Near Field Communication (NFC) tag, a Radio Frequency Identification (RFID) tag, a barcode and/or a Quick Response (QR) code. To this end, the mobile terminal preferably comprises appropriate means. For the purpose of capturing a barcode and/or a QR code, a conventional still picture production apparatus, which is preferably integrated in the mobile terminal, is sufficient, for example. Preferably, within the terminal application, there is also a code included that allows the evaluation of the photographically captured barcode and/or QR code. On the other hand, the mobile terminal may also be designed with NFC and/or RFID means in order to read an NTC tag and/or an RFID tag.

In a preferred embodiment, the method also comprises transmission of a request message by means of the terminal application to the server application, wherein the request message indicates to the server application that maintenance work has been performed on the self-service terminal. By way of example, the terminal application, following the starting of the maintenance application on the self-service terminal, receives from the server application a message that asks the service engineer to begin the maintenance work, that is to say to replace a cash box in a self-service terminal, for example. The service engineer then prompts the terminal application to transmit the request message to the server application. Preferably, the server application transmits the schedule information data to the terminal application only in response to receipt of the request message.

Preferably, the schedule information graphically indicates to a user of the mobile terminal, that is to say a service engineer, for example, what components of the self-service terminal need to be captured by means of the still picture production apparatus.

In addition, the method preferably comprises identification of the maintained component from the still picture data by the server application. The server application is thus able to ascertain what component has been replaced or repaired, for example. In addition, the server application can ascertain further properties of the identified maintained component and transmit them in the form of the update data to the maintenance application. By way of example, the server application ascertains state information relating to the component under consideration, such as counter information, date of a next maintenance operation, content information (e.g. note values and/or numbers in the case of a cash box) etc.

In order to facilitate the identification operation, the component that has been maintained has, in a particularly preferred embodiment, a second identifier that, like the first identifier, preferably comprises a second signaling tag, such as an NFC tag, an RFID tag, a barcode and/or a QR code. In this embodiment, the schedule information data are thus indicative, for example, of a particular number of QR codes or barcodes a particular number of components of the SS terminal needs to be captured by the still picture production apparatus of the mobile terminal. By way of example, the server stores a third database that assigns update data to the identifiers of components of SS terminals. The server application can thus determine the update data and transmit the SS terminal.

According to a second aspect of the present invention, the aforementioned object is achieved by a system for maintaining a self-service terminal having the features of independent patent claim 12. The system of the second aspect of the present invention shares the advantages of the method for the first aspect of the invention and has preferred embodiments that correspond to the above-described embodiments of the inventive method, particularly as defined by the dependent claims. Therefore, reference may be made to the above.

The concept on which the invention is based will be explained in more detail below with reference to the exemplary embodiments illustrated in the figures.

BRIEF DESCRIPTION OF THE DRAWINGS

FIG. 2 is a schematic illustration of an exemplary embodiment of the inventive method for maintaining a self-service terminal.

DETAILED DESCRIPTION

Figure 1:
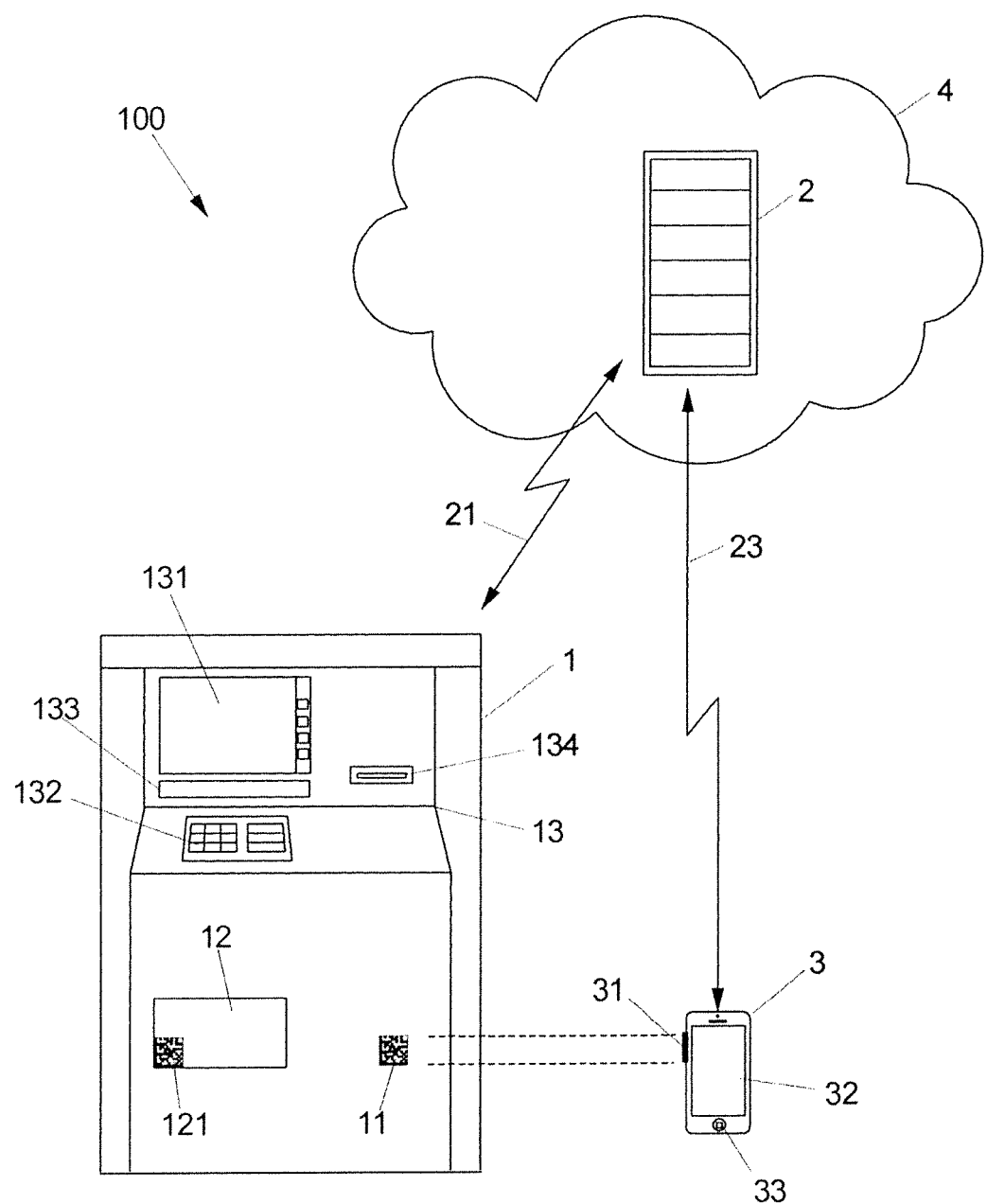
FIG. 1 is a schematic illustration of an embodiment of the inventive system for maintaining a self-service terminal.

FIG. 1 shows a schematic illustration of an exemplary embodiment of an inventive system 100 for maintaining a self-service terminal 1. In parallel therewith, FIG. 2 shows a schematic illustration of an embodiment of an inventive method 5 for maintaining the self-service terminal 1.

The basic situation is first of all described below with reference to FIG. 1. The exemplary system 100 and the exemplary method 5 are then explained with reference to both figures.

The system 100 for maintaining the self-service terminal 1 comprises a server 2 that is arranged in a network 4. The network 4 may be any network, for example the Internet. A network connection 21 can be used by the server 2 to communicate with the self-service terminal 1. In addition, the system 100 comprises a mobile terminal 3, for example a smartphone. A communication link 23 can be used by the server 2 to communicate with the mobile terminal 3.

For the purpose of maintaining the self-service terminal 1, a maintenance application is executed on the self-service terminal, a server application is executed on the server 2 and a terminal application is executed on the mobile terminal 3.

For the embodiments below, it is assumed by way of example that the self-service terminal is an automated teller machine that comprises a cash box 12 that needs to be maintained, that is to say needs to be repaired or, as is assumed for the example that follows, replaced, for example. The automated teller machine 1 may be any automated teller machine that has a user interface 13 that comprises a standard display means 131, an input means 132, a cash dispensing compartment 133 and a card reader 134.

In addition, the automated teller machine 1 is provided with an identifier 11 which, for the example that follows, is assumed to be a QR code. As has been explained above, the identifier 11 may also be an identifier of a different type. The cash box 12 to be replaced is provided with a second identifier 121. The second identifier 121 may also be a QR code.

The mobile terminal 3 (subsequently also referred to as 'terminal') is a smartphone, for example. The terminal 3 has a still picture production apparatus 31, that is to say a camera unit or a scanner, for example. In addition, the mobile terminal 3 comprises a display means 32, such as a touch-sensitive screen that a user of the terminal 3 can use to make inputs. Furthermore, the terminal 3 has one or more operator control keys 33. The terminal 3 is designed to set up the communication link 23 to the server. This communication link 23 is set up via a cellular mobile radio network, for example.

Hence, there exist firstly a network connection 21 that the server 2 can use to communicate with the automated teller machine 1 and secondly the communication link 23 that is used to effect the communication between the terminal 3 and the server 2. However, there is no communication link provided between the automated teller machine 1 and the terminal 3. Thus, neither the automated teller machine 1 nor the terminal 3 needs to have means for communication between the automated teller machine 1 and the terminal 3. It is only necessary for the still picture production apparatus 31 to be able to produce still pictures of the identifiers 11 and 121.

The text below explains a maintenance operation on the automated teller machine 1 with reference to FIG. 1 and FIG. 2. In this case, FIG. 2 schematically shows the automated teller machine 1, the server 2 and the terminal 3 as a respective box. For each of these units, a vertical time axis is provided. The timing sequence of the maintenance method 5 and the manner of operation of the maintenance system 1 will now be described with reference to these time axes.

In step 502, the terminal application is started on the terminal 3, for example by a service engineer who is situated with the terminal 3 in the nearby area of the automated teller machine 1. Then, in step 504, the terminal 3 captures the identifier 11, that is to say the QR code 11 of the automated teller machine 1 by means of the still picture production apparatus 31. This is identified schematically by the dashed lines in FIG. 1.

In step 506, the terminal 3 sends identifier data, which the terminal 3 has produced on the basis of the still picture, to the server 2. On receipt of these identifier data, a server application is executed on the server 2 (step 508). Alternatively, it is possible for the execution of the server application to be effected continuously, that is to say particularly even before the identifier data have been received.

In step 510, the server application takes the identifier data as a basis for identifying the automated teller machine 1 to be maintained. By way of example, the identification involves the ascertainment of a network address for the automated teller machine 1 using a database stored on the server 2. Thereafter, in step 512, the server 2 transmits a start signal to the automated teller machine 1. This initiates the execution of a maintenance application on the automated teller machine 1 (step 514). When the maintenance application has started running on the automated teller machine 1, the automated teller machine 1 confirms proper execution of the maintenance application to the server 2 (step 515).

In step 516, the server 2 then transmits a message to the terminal 3. This message is displayed on the display means 32 by the terminal application and this informs the service engineer that the maintenance work, that is to say the replacement of the cash box 12, can begin. During step 518, the manual maintenance work is thus performed on the automated teller machine 1.

When the maintenance work is concluded, that is to say the cash box 12 has been replaced, the terminal application uses a message, for example following an appropriate user input, to inform the server that the maintenance work has concluded (step 520).

In step 522, the server application determines schedule information data on the basis of the identifier data, that is to say on the basis of the identification of the automated teller machine, and transmits step 524 schedule information data to the terminal via the communication link 23. By way of example, the schedule information data are ascertained using a second database that assigns schedule information data to the identifier data. The schedule information data are indicative of the second QR code 121 of the cash box 12, which needs to be captured still picture production apparatus 31 of the terminal 3.

In step 526, the display means 32 of the terminal 3 is used to display schedule information on the basis of the schedule information data. This schedule information informs the service engineer that he needs to produce a still picture of the second QR code 121 of the replaced cash box 12. In the subsequent step 527, at least one still picture is produced by the still picture production apparatus 31.

This still picture or data that are indicative of this still picture are transmitted from the terminal 3 to the server 2 in step 528. This allows the server 2 to identify the replaced cash box 12 in step 530 and to determine update data on the basis thereof. By way of example, the update data are determined using a third database that assigns update data to the identifiers of components of SS terminals.

In step 532, the server 2 transmits these update data to the maintenance application that is executed on the automated teller machine 1. By way of example, these update data comprise information about a counter reading of the replaced cash box 12 and/or information about a time at which a next replacement needs to be made, and the like.

On the basis of the update data, the maintenance application implements counter information, for example, in step 534 and then, in step 536, notifies the server application about this operation. In step 538, the maintenance application is terminated. The server 2 informs the mobile terminal in step 540 that the maintenance operation has been concluded, so that the terminal application can be terminated in step 542.

The present invention is not limited to the replacement of cash boxes in automated teller machines, however. On the contrary, it is possible for self-service terminals of any type to be advantageously maintained by the inventive system and the inventive method. Since the maintenance operation can be coordinated centrally by the server 2, it is possible to dispense with intelligent components in the self-service terminal that are designed to communicate with a mobile terminal. As shown by the schematic illustration in FIG. 2, no direct communication takes place between the mobile terminal 3 and the self-service terminal 1. This allows the maintenance of the self-service terminal to be effected more reliably and less expensively.

LIST OF REFERENCE SYMBOLS

100 System for maintaining a self-service terminal
1 Self-service terminal
11 Identifier
12 Cash box
121 Second identifier
13 User interface
131 Screen
132 Input means
133 Cash dispensing compartment
134 Card reader
2 Server
21 Network connection
23 Communication link
3 Mobile terminal
31 Still picture production apparatus
32 Display means
33 Operator control key
4 Network
5 Method for maintaining a self-service terminal
502-542 Steps of the method 5

What is claimed is:

1. A method for maintaining a self-service terminal, the method comprising the steps of:
  positioning a mobile device near a first self-service terminal to be maintained, the first self-service terminal selected from a plurality of self-service terminals;
  initiating a mobile application on the mobile device;
  utilizing the mobile device to optically capture a first image of a first identifier associated with the first self-service terminal;
  setting up a communication link between the mobile device and a server via a mobile radio network;
  transmitting information related to the first identifier from the mobile device to the server via the mobile radio network communication link;
  utilizing a service application on the server to identify the first self-service terminal based on the information related to the first identifier;
  setting up a direct network connection between the server and the first self-service terminal that is separate from the mobile radio network communication link;
  transmitting a signal from the server to the first self-service terminal via the direct network connection to initiate a terminal application on the first self-service terminal;
  determining schedule information regarding a first component of the first self-service terminal to be maintained, the first component being selected from a plurality of components of the first self-service terminal based on the information related to the first identifier;
  graphically indicating the first component to a user of the mobile device;
  utilizing the mobile device to optically capture a second image of a second identifier associated with the first component to be maintained;
  utilizing the server to determine update information based on the second image; and
  transmitting the update information to the first self-service terminal from the server via the direct network connection.

2. The method of claim 1, wherein utilizing the mobile device to optically capture the first and second image further comprises the step of capturing the first and second image by means of a picture production apparatus.

3. The method of claim 1, wherein determining the schedule information further comprises the step of transmitting the determined schedule information from the server to the mobile device.

4. The method of claim 1, wherein graphically indicating the first component to the user further comprises the step of displaying the schedule information on a display means of the mobile device.

5. The method of claim 1, further comprising the step of transmitting the second image from the mobile device to the server.

6. The method of claim 1, wherein the mobile application, the server application and the terminal application are software applications executing on the mobile device, server, and first self-service terminal, respectively.

7. The method of claim 6, wherein the server application executing on the server controls both the mobile application executing on the mobile device and the terminal application executing on the first self-service terminal.

8. The method of claim 1, wherein at least one of the first and second identifiers comprises a signaling tag selected from the group consisting of an NFC tag, and RFID tag, a barcode, and a QR code.

9. The method of claim 1, wherein the communication link between the mobile device and the server is set up via a cellular mobile radio network, selected from the group consisting of WLAN, GSM, GPRE, 2GPP, 3GPP, and/or LTE networks.

10. The method of claim 1, further comprising the step of transmitting a request message from the mobile device to the server to indicate that maintenance work has been performed on the first self-service terminal.

11. The method of claim 10, further comprising the step of transmitting the schedule information from the server to the first self-service terminal in response to receiving the request message.

12. The method of claim 1, further comprising the step of utilizing the server to identify the first component from still picture information.

13. A system for maintaining a self-service terminal, the system comprising:
  a server operating within a network, the server configured to execute a server maintenance application to manage a plurality of self-service terminals;
  a mobile device configured to be positioned near a first self-service terminal of the plurality of self-service terminals, the mobile device configured to execute a mobile maintenance application to optically capture a first identifier associated with the first self-service terminal, set up of a communication link between the server and the mobile device via a mobile radio network, and transmit information related to the first identifier to the server via the mobile radio network communication link;

wherein the server is further configured to identify the first self-service terminal to be maintained from information related to the first identifier, through a direct network connection with the first self-service terminal that is separate from the mobile radio network communication link, initiate a terminal maintenance application on the first self-service terminal, determine schedule information based on the information related to the first identifier, and transmit the determined schedule information to the mobile device via the mobile radio network communication link to indicate a first component of the first self-service terminal that needs to be maintained;

wherein the mobile device is further configured to graphically display the schedule information on a display device of the mobile device, optically capture an image of the first component, and transmit the image to the server via the mobile radio network communication link; and wherein the server further is configured to determine update data based on the image and transmit the update data to the first self-service terminal via the direct network connection.

14. The system of claim 13, wherein the mobile device comprises a still picture production apparatus for capturing the first identifier associated with the first self-service terminal and the image of the first component of the first self-service terminal.

15. The system of claim 13, wherein the server maintenance application, the mobile maintenance application and terminal maintenance application are software applications executing on the server, mobile device, and first self-service terminal, respectively.

16. The system of claim 15, wherein the service maintenance application executing on the server controls both the mobile maintenance application executing on the mobile device and the terminal maintenance application executing on the first self-service terminal.

17. The system of claim 13, wherein the mobile device is configured to optically capture an image of a second identifier associated with the first component to be maintained.

18. The system of claim 13, wherein the mobile device is further configured to transmit a request message to the server to indicate that maintenance work has been performed on the first self-service terminal, and wherein the server is further configured to transmit the schedule information to the first self-service terminal in response to receiving the request message.

* * * * *